Dec. 12, 1967

R. P. METZ 3,358,094

ELECTRIC CONTROL DEVICE WITH IMPROVED OPERATING MEANS FOR CIRCUIT INTERRUPTING STRUCTURE

Filed Sept. 29, 1965

2 Sheets-Sheet 1

WITNESSES

Wm. B. Sellers

James F. Young

INVENTOR

Robert P. Metz

BY

William A. Elchik

ATTORNEY

Dec. 12, 1967

R. P. METZ 3,358,094

ELECTRIC CONTROL DEVICE WITH IMPROVED OPERATING MEANS FOR CIRCUIT INTERRUPTING STRUCTURE

Filed Sept. 29, 1965

2 Sheets-Sheet 2

United States Patent Office 3,358,094

Patented Dec. 12, 1967

3,358,094

ELECTRIC CONTROL DEVICE WITH IMPROVED OPERATING MEANS FOR CIRCUIT INTERRUPTING STRUCTURE

Robert P. Metz, Monroeville, Pa., assignor to Westinghouse Electric Corporation, Pittsburgh, Pa., a corporation of Pennsylvania Filed Sept. 29, 1965, Ser. No. 491,266
7 Claims. (Cl. 200—50)

ABSTRACT OF THE DISCLOSURE

An improved handle operating mechanism comprises a rectilinearly movable handle member for operating a circuit interrupter. The handle-operating mechanism is mounted on an enclosed circuit interrupter to cooperate with the circuit interrupter and with latch means in the enclosure.

At certain installations of enclosed electric control devices it is desirable to provide a circuit interrupting structure comprising an externally accessible operating handle that is continuously connected to operate an enclosed circuit interrupter regardless of the position of the enclosure cover. Thus, the operative connection between the operating handle and the rest of the circuit interrupting structure is not disturbed during opening and closing operations of the enclosure cover. In order to provide a safer installation, it is also desirable to provide interlocking means for defeatably latching the enclosure cover in the closed position when the circuit interrupting structure is closed. It is also desirable, for certain applications, to be able to padlock the circuit interrupting structure in certain positions.

An object of this invention is to provide an improved combination comprising an enclosed circuit interrupting structure with a rectilinearly movable operating member and with means defeatably latching the enclosure cover closed when the circuit interrupting structure is in the closed position.

Another object of this invention is to provide an improved enclosed circuit interrupting structure with a rectilinearly movable operating handle and with means for padlocking the operating handle in either of two operating positions.

Conventional circuit interrupters such as switches and circuit breakers that are adapted to be mounted in enclosures do not include the required interlocking features as part of the units. It is desirable, for certain enclosure installations, to supply a handle operating attachment that can be mounted on to a circuit interrupter and to cooperate with an enclosure cover structure in order to provide the required interlocking functions to provide increased leverage for operation of the circuit interrupter.

Accordingly, another object of this invention is to provide an improved handle-operating mechanism comprising a rectilinearly movable operating member, which mechanism can be mounted on a circuit interrupter for operating the operating handle of the circuit interrupter.

Another object of this invention is to provide an improved handle operating mechanism adapted to be mounted on a circuit interrupter to provide a circuit interrupting structure for use in an enclosure which mechanism comprises a rectilinearly movable operating member and means for cooperating with the enclosure cover to defeatably latch the enclosure cover closed when the circuit interrupting structure is in the closed position.

A general object of this invention is to provide an improved dependable and relatively inexpensive handle operating attachment for circuit interrupters.

The invention, both as to structure and operation, together with additional objects and advantages thereof, will be best understood from the following detailed description when read in conjunction with the accompanying drawings.

Figure 1:
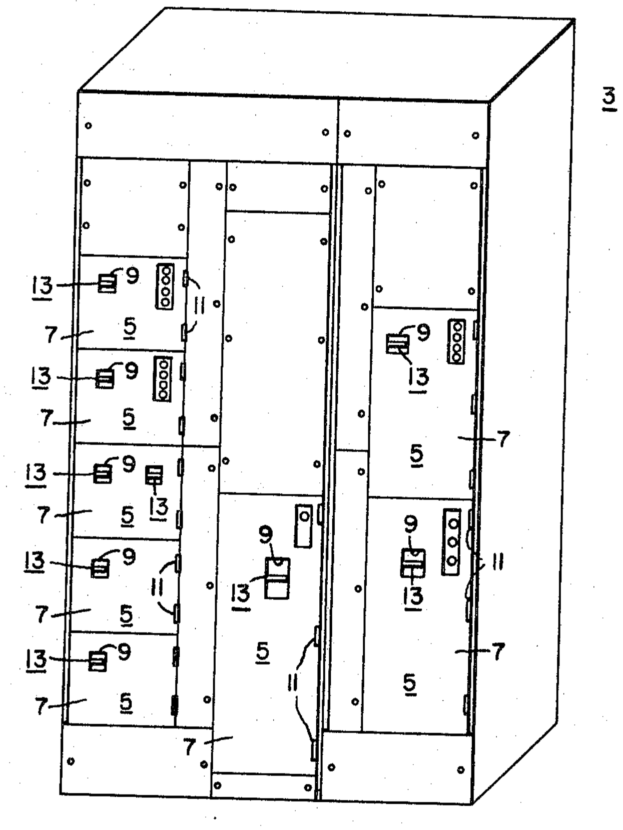
FIGURE 1 is a perspective view of a control center comprising a plurality of circuit interrupting structures constructed in accordance with principles of this invention.

Referring to the drawings, there is disclosed in FIG. 1 a control center 3 comprising a plurality of separate control compartments 5. The control center 3 is more specifically described in the copending patent application of Edmund W. Kuhn et al., Ser. No. 422,850, filed Dec. 31, 1964 now Patent No. 3,321,672.

Each of the compartments 5 comprises a cover structure 7 having one or more openings 9 therein. The cover structures 7 are supported for opening and closing movement on the cabinet part of the control structure by means of hinges 11. A separate circuit interrupting structure 13 is supported in each of the compartments 5. Each of the circuit interrupting structures 13 comprises a handle that protrudes through the associated opening 9 in the associated cover structure 7 to be externally excessible for manual operation when the cover structure 7 is in the closed position. Each of the compartments 5 may comprise one or more circuit interrupting structures 13. Each of the compartments 5 comprises a sheet metal base part (not shown) opposite the associated cover structure 7 for supporting the associated circuit interrupting device 13.

The one circuit interrupting structure 13 and parts associated therewith as disclosed in FIGS. 2 and 3 will be hereinafter specifically described, it being understood that the other circuit interrupting structures and associated parts may be similarly constructed.

Figure 2:
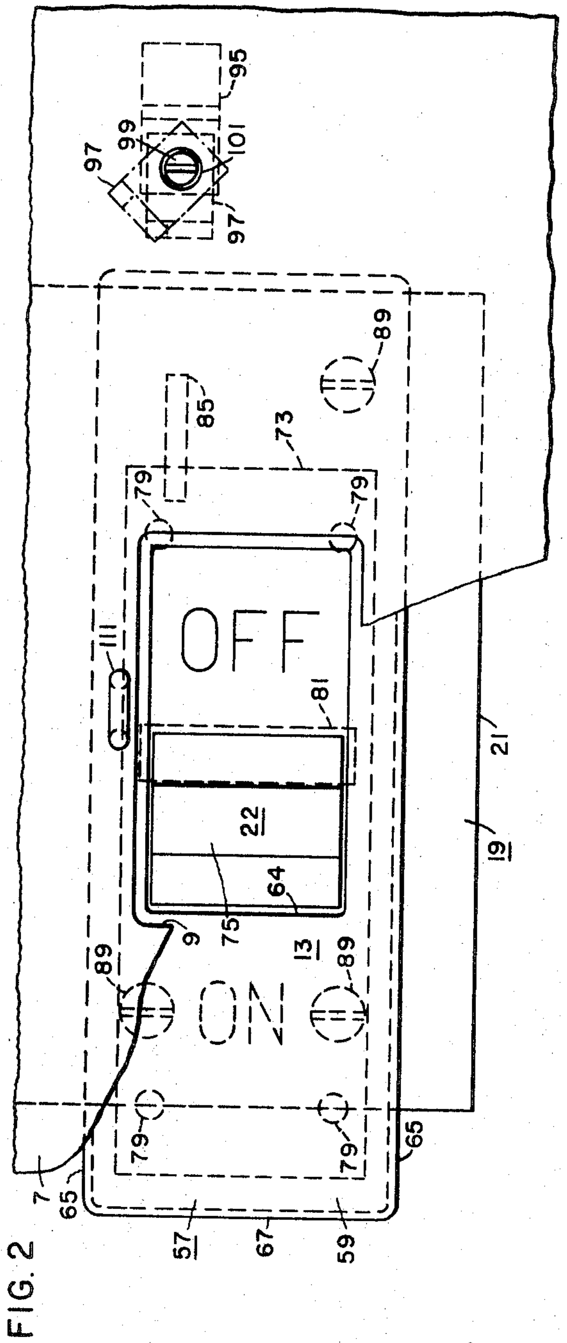
FIG. 2 is a partial top plan view, with parts broken away, of one of the compartments of the control center seen in FIG. 1.
Figure 3:
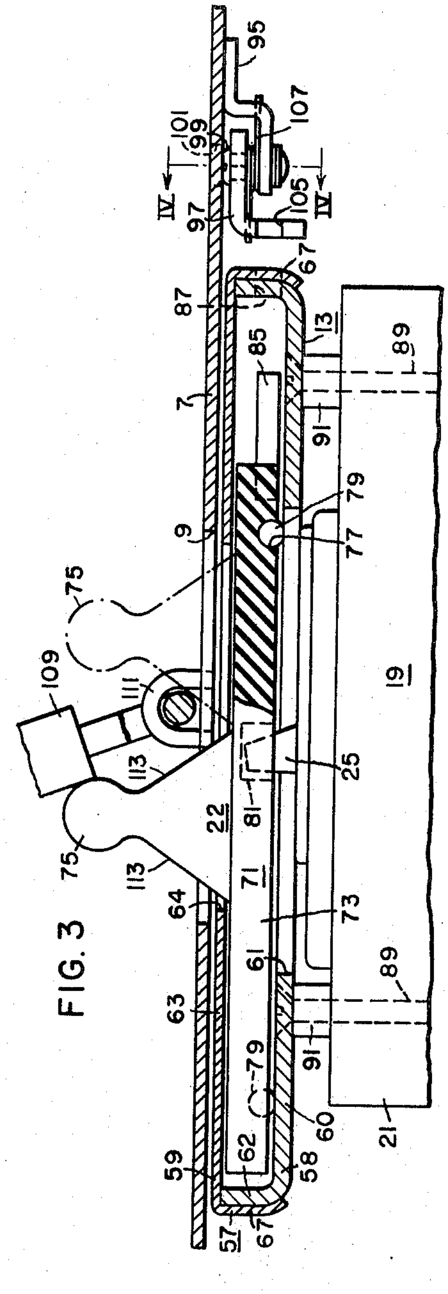
FIG. 3 is a side sectional view, with parts broken away, of the circuit interrupting structure and cover structure disclosed in FIG. 2.

Referring to FIGS. 2 and 3, the circuit interrupting structure 13 comprises a circuit interrupter 19 (only partially shown in FIG. 3) and a handle operating mechanism 22 removably secured to the front cover part of the circuit interrupter 19. The circuit interrupter 19 may be a conventional circuit breaker or switch. As disclosed herein, the circuit interrupter 19 comprises an insulating-housing or molded-case type circuit breaker of the type disclosed in the patent to G. R. Thomas et al., Patent No. 3,073,925, issued Jan. 15, 1963. Thus, only a schematic illustration and a brief description of the circuit breaker 19 is herein provided.

Figure 5:
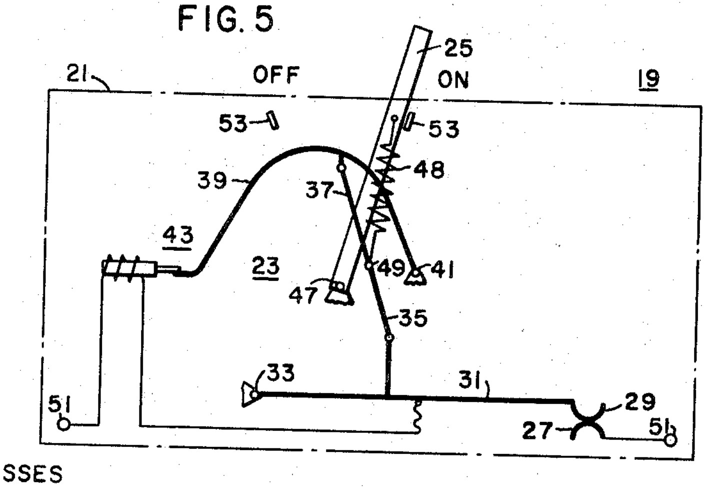
FIG. 5 is a schematic view of the circuit breaker seen in FIGS. 2 and 3.

Referring to FIG. 5, the circuit breaker 19 comprises a housing 21 of molded insulating material and a circuit breaker mechanism 23 disposed within the housing 21. The manually operable toggle lever or handle 25 protrudes out from the housing 21 through a suitable opening in the front of the housing 21. The circuit breaker mechanism 23 also comprises a stationary contact 27 and a movable contact 29. The movable contact 29 is connected to a contact arm 31 that is pivotally supported in the housing 21 at 33. A toggle, comprising a lower toggle link 35 and an upper toggle link 37, operatively connects the contact arm 31 with a trip member or cradle member 39 that is pivotally supported in the housing 21 and 41. The free end of the trip member 39 is latched by means of an electromagnetic trip latch means 43.

The operating lever or handle 25 is pivotally supported in the housing 21 on a pivot pin 47. An over center spring 48 is connected under tension at one end on the lever 25 and at the other end on the knee pivot 49 of the toggle 35, 37. Suitable terminals 51, disposed at opposite ends of the housing 21, are provided for connecting the trip and latch means 43, contact arm 31, and contacts 29, 27 in an electric circuit. The circuit breaker is disclosed in FIG. 5 in the "on" or contact-closed position. In order to open the circuit breaker, the lever or handle 25 is moved to the "off" in position which movement moves the spring 48 to collapse the toggle 35, 37 thereby moving the contact arm 31 and contact 29 away from the contact 27 to a contact-open position. Suitable stop means 53 are provided to limit movement of the handle 25 in both directions. In order to close the circuit breaker, the handle 25 is moved back to the "on" position which movement operates through the over center spring 48 to straighten the toggle 35, 37 to move the switch arm 31 to the contact-closed position seen in FIG. 5. Upon the occurrence of an overload current above a predetermined value, the electromagnetic trip and latch means 43 is energized to release the trip member 39 whereupon the spring 48 operates to rotate the trip member 39 in a clockwise (FIG. 5) direction to effect a change of the line of action of the spring 48 whereupon the spring 48 will operate to collapse the toggle 35, 37 to move the switch arm 31 to the contact-open position. The circuit breaker is relatched by moving the handle 25 to the full "off" position. During this movement a suitable projection (not shown) on the handle 25 engages the trip member 39 and rotates the trip member to the position seen in FIG. 5 where the trip and latch means 43 automatically latches the trip member 39 in the latched position. The circuit breaker 19 can also comprise a thermal trip that will release the trip member 39 to effect a tripping operation after a time delay upon the occurrence of lesser overload currents in a manner well known in the art.

The handle-operating mechanism 21 (FIGS. 2 and 3) comprises a sheet-metal housing structure or support 57 comprising a back or base part 58 and a front or cover part 59. The tray-shaped base part 58 comprises a generally planar bottom part 60 having an opening 61 therein and oppositely disposed sidewalls and endwalls 62 extending from the generally planar base part 60 in a direction generally normal to the base part 60 toward an open top. The tray-shaped top part 59 comprises a generally planar part 63 having an opening 64 therein and sidewall means comprising two sidewalls 65 (FIG. 2) and two end walls 67 (FIGS. 2 and 3) extending from the top part 63 toward an open bottom. As can be seen in FIG. 3, the base part 58 has a greater thickness than the top part 59. The base part 58 is a more rigid structure than the top part 59. The two end walls 67 of the top part 59 are curved at the end parts thereof and the top part is a generally resilient sheet metal member so that during assembly the top part 59 can be snapped on to the base part 58 with the generally curved parts of the endwalls 67 frictionally engaging the base part 58 to retain the top part 59 in the assembled position. A molded insulating handle member 71, comprising an inner main body part 73 and a handle part 75, is supported on the enclosure support 57. As can be seen in FIG. 3, the main body part 73 is disposed within the enclosure structure 57 and the handle part 75 protrudes out through the opening 64 in the enclosure 57. The main body part 73 of the handle member 71 is provided with four semi-spherical depressions 77 disposed at the four corners of an imaginary rectangle, and a separate spherical bearing member 79 is captured in each of the depressions 77, between the members 58 and 71, to provide a bearing surface so that the handle member 71 can freely move along the bearings 79 in the enclosure support 57. The inner main body part 73 of the handle 71 is provided with an opening 81 (FIG. 3) for receiving the handle 25 of the circuit interrupter 19 to provide an operative connection between the handle member 71 and the circuit interrupter 19. An elongated rigid rod member 85 is fixedly secured to the main body part 73 of the handle member 71. An opening 87 is provided at one end of the enclosure 57 to receive the rod or interlocking member 85 permitting the member 85 to protrude out through the enclosure 57 when the handle member 71 is moved to the "on" or contact-closed position.

During assembly of the handle operating mechanism 21 to the circuit interrupter 19, the base part 58 of the enclosure support 57 is secured to the circuit breaker 19 by means of four bolts 89. Four spacers 91 may be provided to better support the four corner parts of the enclosure 57 on the circuit breaker housing 21. The base part 58 of the enclosure 57 engages the front of the circuit breaker housing 21 adjacent the handle 25. With the base part 58 secured in position, the handle member 71 and four bearings 79 are placed in position in the base part and the cover part 59 is then snapped into the supported position seen in FIGS. 2 and 3. As was previously set forth, each of the endwalls 67 of the cover part 59 is curved at the end thereof and the member 59 is generally resilient whereby the cover 59 may be snapped into the mounted position, in which position the endwalls 67 engage the base part 58 to provide a frictional mounting engagement of the top part 59 on the base part 58. When the handle operating attachment 21 is in place, the handle 75 can be moved rectilinearly to move the member 71 freely on the bearings 79, between the "on" or contact-closed and "off" or contact-opened positions, to operatively move the operating lever or handle 25 of the circuit interrupter 19 to open and close the contacts of the circuit interrupter. When the parts of the handle operating mechanism 21 are secured together, the bearing members 79 are captured in place on the handle operating attachment within the enclosure support part 57 of the handle operating mechanism.

A generally Z-shaped latch support bracket 95 is welded or otherwise fixedly secured to the inner surface of the enclosure or cover door 7. A generally L-shaped latch member 97 is pivotally secured on the bracket 95 by means of a bolt member 99. The member 97 is fixedly secured to the bolt 99 and the bolt 99 is rotatably mounted on the bracket 95. An opening 101 (FIGS. 2 and 4) is provided in the cover 7 to provide access to the bolt 99. An open ended slot 105 (FIG. 4) is provided in the latch member 97. A spring member 107 is provided to bias the member 97 to the normal latching position seen in FIG. 3.

Figure 4:
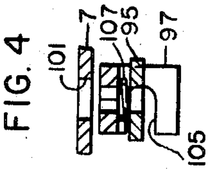
FIG. 4 is a sectional view taken generally along the line IV—IV of FIG. 3.

With the handle operating mechanism 21 in place in the mounted position seen in FIG. 3, the circuit interrupter 25 is operated by rectilinear back-and-forth movement of the handle 75 between the "on" and "off" positions. The handle member 71 freely moves on the four bearings 79. When the cover 7 is in the closed position seen in FIGS. 2 and 3, the cover will be automatically latched in the closed position when the circuit interrupter 19 is operated to the "on" or contact-closed position. During this operation, the rigid rod member 85 protrudes through the opening 87 in the housing structure 57 moving into the open-ended slot 105 in the latch member 97. Thus, when the contacts of the circuit interrupter 19 are closed the latch member 97 will engage the interlocking rod 85 to prevent opening of the cover 7. The interlock can be defeated. A screwdriver may be passed through the opening 101 in the cover 7 to rotate the bolt 99 and the latch 97 in a clockwise (FIG. 2) direction against the bias of the spring 107 to move the latch 97 out of latching engagement with the interlock rod 85. This defeating movement is permitted because of the open end of the slot 105 (FIG. 4). While the latch 97 is held in the unlatching position against the bias of the spring 107, the cover 7 can be freely moved to the open position.

The handle member 71 can be padlocked in either the "on" or "off" position by passing the hasp of a padlock 109 through a rigid padlock loop 111 that is welded or otherwise fixedly secured to the cover 7. The handle 75 is formed with sidewalls 113 that diverge toward the inner part 73 whereby a part of the handle 75 is in proximity to the hasp of the padlock 109 whether the handle 75 is in the "on" position or "off" position.

From the foregoing, it can be understood that there is provided by this invention an improved circuit interrupting structure comprising a circuit interrupter and a handle operating mechanism that is removably secured to the circuit interrupter. The circuit interrupter may be a standard molded-case type circuit breaker or a standard type of switch. The handle operating mechanism comprises a handle member that is supported for rectilinear movement on bearing members that are captured in a housing support structure during assembly of the mechanism. An elongated rigid interlock rod is fixedly connected to the handle member. When the circuit interrupting structure is closed the rod 85 protrudes through an opening in the housing structure to cooperate with a defeatable latch on an enclosure cover to thereby prevent opening of the enclosure cover when the circuit interrupting structure is in the "on" or contact-closed position. The handle operating mechanism is easily assembled in that the handle member and bearings are merely placed in position on the base part of the support and the cover part is snapped onto the base part to complete the assembly. The latch member, that is mounted on the enclosure cover to cooperate with the interlock rod on the handle-operating mechanism, is provided with an open ended slot and the latch is rotatably supported on a suitable bracket on the cover whereby the interlock may be defeated by rotation of an externally accessible screw which rotation moves the latch out of latching engagement with the interlock rod. A single padlock loop is positioned on the cover structure to receive the hasp of a padlock to enable padlocking of the circuit interrupting structure in either the "on" position or "off" position.

Since numerous changes may be made in the above-described construction and different embodiments of the invention may be made without departing from the spirit and scope of the invention, it is intended that all matter contained in the foregoing description or shown in the accompanying drawings be interrupted as illustrative and not in a limiting sense.

I claim as my invention:

1. A circuit interrupting structure adapted for use in an enclosure having an openable cover structure with an opening therein and a latch part thereon, said circuit interrupting structure comprising a circuit interrupter and a handle-operating mechanism mounted on said circuit interrupter, said circuit interrupter comprising a pair of contacts and an operating lever movable between operating positions to open and close said contacts, said handle-operating mechanism comprising a support, an operating member mounted on said support for rectilinear movement, said operating member being operatively connected to said operating lever, said operating member being rectilinearly movable between two operating positions to operate said operating lever to open and close said contacts, and an interlock part on said operating member for cooperating with said latch part to latch said cover structure closed when said circuit interrupting structure is in the contact-closed position.

2. In combination, an enclosure having an openable cover structure with an opening therein and a latch part thereon, a circuit interrupting structure mounted within said enclosure, said circuit interrupting structure comprising a circuit interrupter and a handle-operating mechanism mounted on said circuit interrupter, said circuit interrupter comprising a pair of contacts and an operating lever movable between operating positions to open and close said contacts, said handle-operating mechanism comprising a support, a handle member mounted on said support for rectilinear movement, said handle member being operatively connected to said operating lever, said handle member being rectilinearly movable between two positions to operate said operating lever to open and close said contacts, an interlock member fixedly secured to said operating member and movable as a unit with said operating member to cooperate with said latch part to thereby latch said cover structure closed when said circuit interrupting structure is in the contact-closed position, and externally excessible means operable to move said latch part to an unlatching position clear of said interlock member to permit opening of said cover structure when said circuit interrupting structure is in the contact-closed position.

3. A circuit interrupting structure adapted for use in an enclosure having an openable cover structure with an opening therein and a latch part thereon, said circuit interrupting structure comprising a circuit interrupter and a handle-operating mechanism removably connected to said circuit interrupter, said circuit interrupter comprising a pair of cooperable contacts and an operating lever movable between operating positions to open and close said contacts, said handle-operating mechanism comprising an enclosure support having opening means at the front and back sides thereof, a handle member supported on said enclosure support, said handle member comprising a main body part supported within said enclosure support and a handle part extending through the opening means in the front side of said enclosure support, said operating lever protruding through said opening means in said back side of said enclosure support and being operatively connected to said main body part, bearing means in said enclosure support providing a bearing support for rectilinear movement of said handle member on said enclosure support, said handle member being movable between two positions to operate said operating lever between a contact-opened position and a contact-closed position, said enclosure support having interlock-receiving opening means therein, an interlock member connected to said main body part of said handle member, when said handle member is in the contact-closed position said interlock member protruding through said interlock-receiving opening means whereby said interlock member can cooperate with said latch part to latch said cover structure in the closed position when said handle member is in the contact-closed position.

4. A handle-operating mechanism adapted for use with a circuit interrupter of the type comprising a pair of contacts and an operating lever movable between operating positions to open and close said contacts, said handle-operating mechanism comprising an enclosure support having opening means at the front and back sides thereof, a handle member comprising a main body part within said enclosure support and a handle part protruding through the opening means at the front side of said enclosure support, said main body part being adapted to be connected to said operating lever that may extend through the opening means in the back side of said enclosure support, and said handle member being movable rectilinearly between operating positions to operate said operating lever to open and close said contact.

5. A handle-operating mechanism adapted for use with a circuit interrupter of the type comprising a pair of contacts and an operating lever movable between two positions to open and close said contacts, said handle-operating mechanism comprising an enclosure support having opening means at the front and back sides thereof, a handle member comprising a main body part within said enclosure support and a handle member protruding through the opening means at the front side of said enclosure support, said main body part being adapted to be connected to the operating lever that may extend through the opening means in the back side of said enclosure support, said handle member being movable rectilinearly between two positions to operate said operating lever to open and close said contacts, bearing means captured in said enclosure support between said main body part and said enclosure support to provide a bearing support for rectilinear movement of said handle member on said enclosure support.

6. A handle-operating mechanism adapted for use with a circuit interrupter of the type comprising a housing having a pair of contacts supported therein and a movable operating handle protruding therefrom, said handle-operating mechanism comprising an enclosure support comprising a back part and a front part removably connected to said back part, each of said back and front parts having opening means therein, a handle member mounted on said enclosure support and comprising a main body part disposed generally within said enclosure support and a handle member extending through said opening means in said front part, said main body part being adapted to be connected to said operating lever, and said handle member being rectilinearly movable between two operating positions to operate said operating lever to open and close said contacts.

7. A handle-operating mechanism for operating a molded-case type circuit breaker of the type comprising an insulating housing having cooperable contacts therein and an operating handle protruding therefrom to operate said contacts, said handle operating mechanism comprising an enclosure support, said enclosure support comprising a back part and a front part, each of said back and front parts comprising a generally planar base having opening means therein and sidewall means extending from the base generally normal to the base, said back part comprising a generally rigid member, the sidewall means of said front part comprising generally resilient parts, means mounting said front part on said back part with said bases being disposed in a generally parallel spaced relationship and with said generally resilient parts of said sidewall means of said front part engaging the sidewall means of said back part to provide a frictional mounting engagement of said front part on said back part, a handle member mounted on said enclosure support and comprising a main body part disposed generally within said enclosure support and a handle member extending through said opening means in said front part, said enclosure support being adapted to be mounted on said insulating housing, said main body part being adapted to be connected to said operating lever when said operating lever protrudes through said opening means in said back part, roller bearing means captured in place between said main body part of said handle member and the base of said back part of said enclosure support, said handle member being rectilinearly movable on said roller bearing means between two operating positions to operate said operating lever to open and close said contacts.

References Cited

UNITED STATES PATENTS

| | | | |
|---|---|---|---|
| 3,179,761 | 4/1965 | Malota et al. | 200—50.1 |
| 3,213,218 | 10/1965 | Herrmann et al. | 200—50.1 |
| 3,240,888 | 3/1966 | Rys et al. | 200—50.1 |

ROBERT K. SCHAEFER, *Primary Examiner.*

J. R. SCOTT, *Assistant Examiner.*